United States Patent [19]

Black et al.

[11] Patent Number: 4,624,783

[45] Date of Patent: * Nov. 25, 1986

[54] APPARATUS FOR GRANULAR MEDIA FILTER

[75] Inventors: Brent C. Black; Bruce D. Bradley; Ralph B. Haymore, all of Salt Lake City, Utah

[73] Assignee: Envirotech Corporation, Menlo Park, Calif.

[*] Notice: The portion of the term of this patent subsequent to May 29, 2001 has been disclaimed.

[21] Appl. No.: 693,435

[22] Filed: Jan. 22, 1985

[51] Int. Cl.[4] ............................................. B01D 23/24
[52] U.S. Cl. .................................... 210/271; 210/275; 210/293
[58] Field of Search ............... 210/270, 271, 275, 276, 210/293

[56] References Cited

U.S. PATENT DOCUMENTS

| | | | |
|---|---|---|---|
| 1,748,898 | 2/1930 | Peebles | 210/270 |
| 2,311,594 | 2/1943 | Lose, Jr. | 210/270 |
| 4,133,766 | 1/1979 | Adie | 210/275 |
| 4,450,077 | 5/1984 | Black et al. | 210/275 |
| 4,486,307 | 12/1984 | Weiler | 210/275 |

Primary Examiner—John Adee
Attorney, Agent, or Firm—Carl A. Rowold

[57] ABSTRACT

Apparatus for backwashing the filter media of a liquid filtering machine while at the same time enabling the machine to filter liquid. The machine is of the type having a tank and a continuous bed of granular filter media in the tank through which liquid having suspended solids therein for removing the solids. The apparatus comprises a partitioning chamber and a carriage for selectively supporting and conveying the chamber above the media bed, with the chamber being insertable into the bed to isolate a portion thereof from the remainder of the bed. The apparatus further comprises a mechanism to selectively allow insertion of the chamber into the bed and to remove it, and a pump to draw liquid through the isolated portion of the bed to backwash it, while filtration may proceed in the remainder of the bed. Apparatus for removing the media from the chamber and replacing it with new, cleaned or regenerated media is also disclosed.

15 Claims, 4 Drawing Figures

APPARATUS FOR GRANULAR MEDIA FILTER

BACKGROUND OF THE INVENTION

The present invention relates to the separation of solids from liquids by filtration through granular media and, more particularly, to an improvement in apparatus for granular media filters of the type having a tank and a bed of granular filter media in the tank through which liquids having suspended or dissolved solids therein flow for removing the solids to clean the liquid.

Granular media filters are known for removing solids from liquids. Such filters have long been utilized for potable water treatment but have only recently been introduced to wastewater treatment plants, where the solids may comprise microbial flocs, coagulant residues, and a variety of other relatively unpredictable substances. Such filters normally include a tank for receiving flowing liquid containing suspended solids, a bed of granular media supported within the tank, means for removing liquid which has passed through the media (filtrate), and means for periodically washing the granular media to remove particulates collected therein during filtration. Because the washing step is usually accomplished by passing liquid through the bed in a direction opposite to the flow direction for filtration, the washing step is usually referred to as backwashing.

In one well-known granular media filter construction, filtration is accomplished in the downward direction so that filtrate is removed from beneath the media. Such "downflow" filters may be capable of either semi-continuous or continuous operation. In this latter operation, partitioning walls are fixedly mounted to form a plurality of individual cells within the granular media bed so that backwashing can be accomplished in one of the cells while filtration proceeds in the other cells. Such filtering machines are shown in U.S. Pat. Nos. 3,239,061 and 4,151,265.

In "semi-continuous" granular media filters, the entire granular bed is used simultaneously for filtration until the bed collects solids to the extent that its resistance to flow adversely affects the rate of operation of the machine, or the effectiveness of removing solids. Then the machine is removed from filtration service and the entire bed is cleaned as a unit.

Granular media filters may also be of the type used to remove dissolved solids from liquid. Such filters typically use filter media of activated carbon, which physically adsorbs dissolved solids from the liquid. Over time, the activated carbon may adsorb so much dissolved solids material as to become saturated or spent. In this event, the spent filter media must be removed from the filter, and new or regenerated media delivered to the filter. Similarly, in granular media filters of the above-described type used to remove suspended solids, the media may after long usage be rendered unsuitable for further filtering, even if backwashed. This media must then be removed, and new media or media cleaned by methods other than backwashing must be delivered to the filter. With either type of filter, the filtration operation of the filter must be terminated while the filter media is being replaced.

SUMMARY OF THE INVENTION

A primary object of the present invention is to provide an improved granular media filter wherein a particular volume or section of the filtration bed can be isolated for backwashing or for removal of the filter media while allowing filtration to proceed in the remainder of the bed. More particularly, an object of the present invention is to provide novel and economical ways and means to isolate selected portions from the remainder of the granular bed, without providing fixed partitioning walls, so as to enable backwashing or removal of the isolated sector while filtration proceeds in the remainder of the bed.

To the above-stated ends, the present invention provides apparatus for a granular media filter wherein the granular bed in continuous—which is to say, is not sectionalized by fixed partition members—and which includes a selectively-positionable partitioning mechanism for insertion into the bed to isolate a selected section from the remainder of the bed so that backwashing or removal of the filter media can be accomplished in the isolated section while filtration proceeds in the remainder of the bed.

Further objects and advantages of the present invention can be readily ascertained from the following description and appended drawings, which are offered by way of example and not in limitation of the present invention, the scope of which is defined by the appended claims and equivalents.

IN THE DRAWINGS

Figure 2:
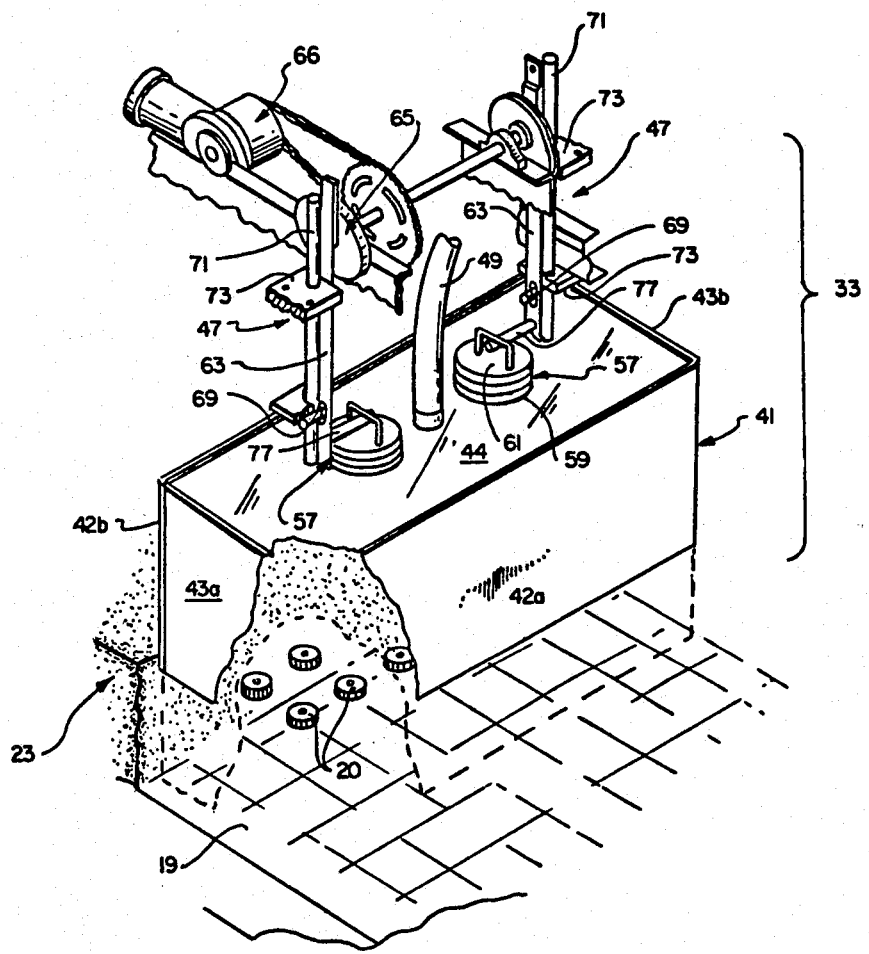
FIG. 2 is a pictorial detail of the apparatus of FIG. 1 particularly illustrating a partitioning mechanism.
Figure 3:
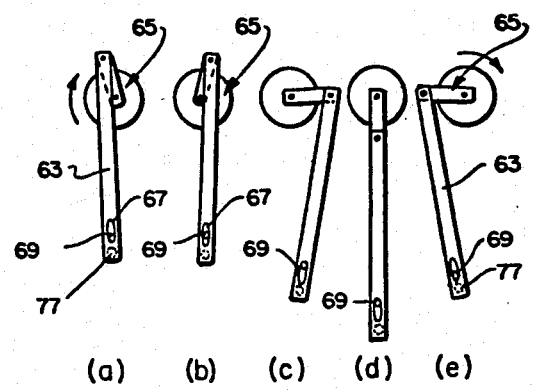
Figure 4:
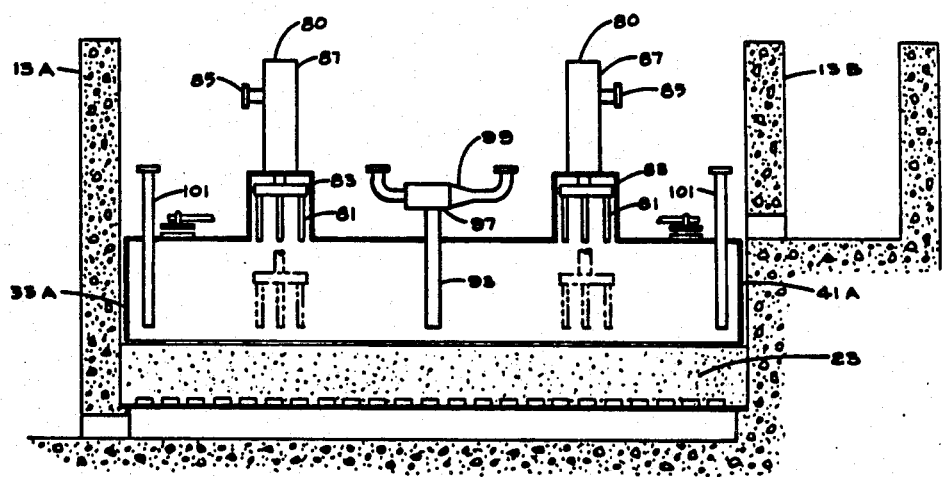

FIGS. 3 (a) through (e) are details of a linkage system incorporated in the mechanism of FIG. 2; and FIG. 4 is a schematic of an alternative embodiment of the apparatus of this invention adapted to remove the filter media and deliver replacement filter media.

Corresponding reference characters indicate corresponding parts throughout the several views of the drawings.

DETAILED DESCRIPTION OF THE PREFERRED EMBODIMENTS

Figure 1:
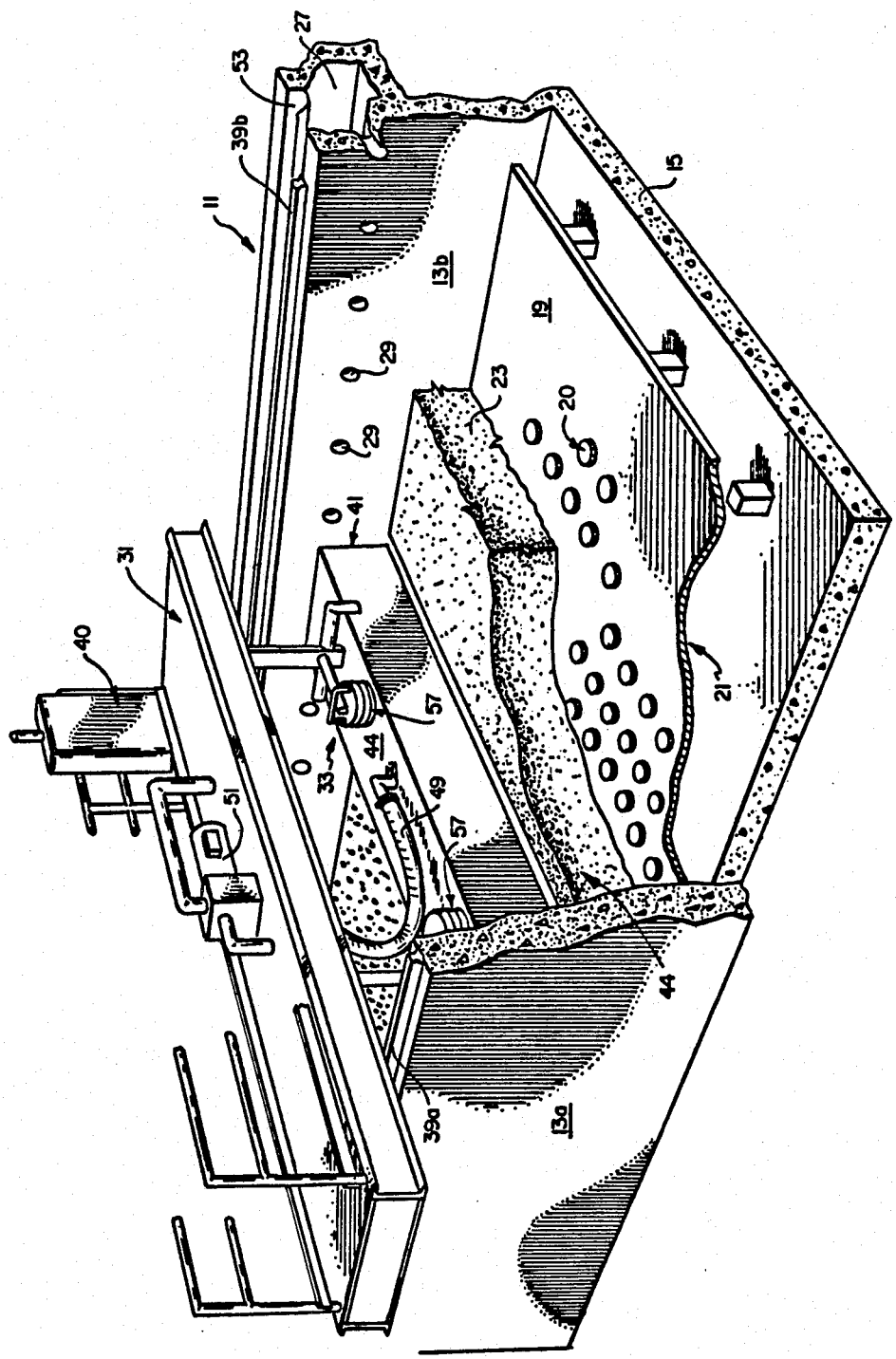
FIG. 1 is a pictorial view of a filtering machine having apparatus of this invention, portions of the filtering machine being cut away for purposes of illustration.

The filtering machine of FIG. 1 includes an open rectangular basin or tank 11 having upstanding sidewalls 13a and 13b, a bottom wall 15 and endwalls (not shown). A generally horizontal member 19, herein referred to as an underdrain support means, is mounted within the tank 11 adjacent the bottom wall 15. The purpose of the underdrain support means 19 is threefold. First, as its name implies, it supports an overlying filtration bed 23 composed of granular media. Second, the illustrated underdrain support means includes conventional underdrain nozzles 20 which cooperatively assist in backwashing the bed to remove collected particulates. Third, the underdrain support means includes drainage ports, herein nozzles 20, through which filtrate passes after having percolated through the granular bed. The filtrate receiving chamber 21 below the underdrain support means is basically an open cavity extending beneath the entire extent of the bed. That is, the filter receiving chamber need not contain any complex system of pipes or headers to accommodate backwashing. Ultimately, filtrate is collected in clearwells, not shown, located at an end of the filtrate receiving chamber 21, or, alternatively, along a side of the chamber 21.

The granular media which comprises the filtration bed 23 can be composed of various materials. For example, the granular media can be gravel, sand, anthracite, activated carbon, or various resins of pre-selected grain size. It can be composed either of a single material or of two or more different materials laid in strata. Also, intermixed granular medias are known. In any such embodiment, the bed 23 is continuous and fills a substantial portion of the tank 11 above the support means 19 and has a generally horizontal upper surface. The purpose of the bed is to remove solids from influent liquid which percolates through the bed; to this end, the bed performs the functions of straining, intercepting, retaining and/or adsorbing solids.

The machine of FIG. 1 further includes means for distributing influent liquid containing solids across the surface of the granular bed. The illustrated influent distribution means includes an open trough or flume 27 supported along sidewall 13b of the tank 11, and ports 29 formed through the side wall of the flume at spaced-apart intervals. The ports 29 are in liquid-flow communication with the flume 27 so that influent liquid passes from the flume through the ports 29 to distribution across the surface of the filtration bed 23 in a uniform, relatively non-turbulent flow pattern. These same fucntions can be achieved by other influent distribution means such as, for example, a system of manifolds and pipes.

Referring still to FIG. 1, there is shown apparatus of this invention which includes a selectively-movable carriage mechanism which supports and conveys a partitioning chamber means 33 across the upper surface of the bed 23 along the length of the tank 11. The illustrated carriage mechanism comprises a bridge 31 which traverses the tank 11 and is supported and guided on the sidewalls 13a and 13b by parallel rail members 39a and 39b which extend lengthwise of the respective sidewalls. An indexing means moves the bridge 31 to selected spaced-apart locations along the rails. Preferably the indexing means comprises an electric gearmotor operatively coupled to drive wheels (not shown) mounted to the bridge, and limit switches to disengage power to the drive wheels when the bridge 31 reaches the preselected location on the rails. It should be understood, however, that the above-described bridge 31 and indexing means are only examples of various means which can be utilized to convey the partitioning means 33 to predetermined locations above the surface of the filtration bed 23. For example, the partitioning means 33 can be supported directly from the rails.

Alternately, the partitioning chamber means may be supported by means other than by the walls of the tank 11, such as would be the case for a truck mounted portable backwashing system in which a boom from the truck may serve as the carriage mechanism.

The partitioning chamber means 33 shown in FIGS. 1 and 2 includes an elongated box-like chamber 41 having vertically extending sidewalls 42a and 42b, endwalls 43a and 43b, a topwall 44, and an open bottom. The partitioning chamber 41 spans the width of the filter bed. The width of chamber 41 defines the width of the section of the filtration bed which is to be isolated for backwashing and, accordingly, is matter of design choice. Normally, the isolated section would be between about 1.3 to about 2.6 feet in width. For reasons which will become obvious hereinafter, the vertical extent of the sidewalls and endwalls should slightly exceed the depth of the bed 23, say by about eight to twelve inches in order to, inter alia, accommodiate expansion of the granular bed.

As best shown in FIG. 2, the partitioning chamber 41 is suspended from the bridge 31 or other suitable carriage mechanism by a pair of reciprocatable mechanisms, generally indicated by numeral 47, for selective up-and-down movement. (In the following, only one of the reciprocatable mechanisms 47 will be described in detail; the other mechanism of the pair is functionally identical.) In its uppermost position, the reciprocatable mechanisms 47 raises the chamber 41 sufficiently that the lower edges of the sidewalls and endwalls are spaced above the surface of the bed 23. In the lowermost position, the sidewalls and endwalls extend into the bed so that their edges rest against the underdrain support 19. In essence then, the partitioning chamber is dimensioned so that, in its downward-most position, it is submerged below the surface of the freeboard liquid and encloses or isolates a portion of the granular bed while leaving the afore-mentioned clearance between the surface of the bed and the top of the chamber.

The normal liquid level within the tank 11 during filtration is usually about 26 to about 42 inches above the underdrain support means 19. For the illustrated embodiment of the partitioning chamber 41, the liquid depth extends above the topwall 44, when the chamber is fully inserted into the granular bed.

As shown both in FIGS. 1 and 2, a backwash withdrawal means is mounted in communication with the interior of the partitioning chamber 41. The illustrated backwash withdrawal means comprises a conduit 49 connected at its one end in liquid-flow communication with the interior of the partitioning chamber and at its other end with a pump 51 mounted to travel with the bridge 31. A manifold, not shown, can be mounted in communication with the conduit 49 internal of the chamber 41 to uniformly draw backwash liquid across the horizontal extent of the chamber. In the illustrated embodiment, the pump 51 discharges spent backwash liquid into an open trough 53 mounted within or next to the influent launder 27 and extending the length thereof.

At this juncture, it should be appreciated that the partitioning chamber means 41 can have various functionallyequivalent, structural embodiments. For example, the endwalls 43a and 43b of the chamber can be eliminated if the ends of the chamber (which would then be open) are in a generally sealing relationship with the interior sidewalls 13a and 13b of the tank 11. As another example, the top wall of the chamber 41 can be eliminated and the sidewalls extended upward to prevent freeboard liquid from flowing downward into the chamber when the same is fully inserted into the bed 23. Moreover, the chamber may be of any sectional shape, such as square, rectangular circular, or wedge shaped. In the lexicon of the present invention, these various embodiments are all to be understood to be encompassed by the term "partitioning chamber means."

Further, it should be understood that auxiliary backwash withdrawal means can be employed. Thus, in addition to the above-described withdrawal means, a pump means can be connected to force air or liquid into the partitioning chamber during or prior to backwashing to assist in the backwash. That is, the air or liquid conveyed by the auxiliary pump would assist in dislodging and discharging particulates from the granular bed during or prior to backwashing. One such auxiliary backwash apparatus 80 is shown in FIG. 4 to comprise a series of probes or lances 81 carried on a movable manifold 83 in communication with a source of pressurized air or liquid (not shown) via tubing 85 and means, such as cylinder 87, for selectively raising the probes above the bed and lowering the probes into the bed 23.

Also mounted in communication with the interior of the illustrated partitioning chamber 41 are selectively operable release-valve means, illustrated in FIGS. 1 and 2 as valves 57. Each of the illustrated valves includes an annular seat 59 which is mounted to the top wall 44 of the partitioning chamber in registry with an aperture formed through the topwall, and a circular valve plate 61 mounted for selective closure against the seat. In the illustrated embodiment, the closure plates 61 are connected to the reciprocatable mechanisms 47a and 47b which, in turn, provide selective opening and closing of the respective valves.

As shown in FIGS. 2 and 3, each one of the pair of reciprocatable mechanisms includes a crank mechanism 65 mounted to the bridge 31 and an elongated linkage member 63 which is pivotably connected to its lower end to the topwall 44 of the partitioning chamber and at its upper end to the crank mechanism 65. In the illustrated embodiment, each linkage member 63 has a vertically-elongated slot 67 formed near its lower end; horizontal pin members 69 (herein referred to as lift pins) are freely received in slots 67 with the other end of the pins being fixed to vertically-disposed guide shafts 71. Each guide shaft is rigidly fixed at its lower end to the partitioning chamber 41, thereby establishing pivotal connections between the linkage member and the partitioning chamber. At its upper end, the guide shafts 71 are slidably received in a registered pair of guiding means 73, one pair being on each side of the bridge 31. Thus, the guide shafts 71 and guiding means 73 function to restrain the partitioning chamber from movement in other than the vertical direction. At the lower end of the linkage members 63, second pin member 77 is rigidly affixed to the linkage member to enable opening and closing of the circular valve plates 61.

In operation, the reciprocatable mechanisms 47a and 47b jointly serve to raise and lower the partitioning chamber 41 and to selectively open the valves 57. The operation of the reciprocatable mechanism can be best understood with reference to FIG. 3, where it can be seen that the vertical position of valve closure plate is controlled by the linkage member in the sense that, when the reciprocatable mechanism 47a begins its upward travel, the valve closure plate 61 begins to lift from its seat 59, except for any slack introduced by attachment between the pin 77 and the closure plate 61. Initiation of upward travel of the partitioning chamber 41 is controlled by the dimension of the slot 67 in the linkage arm 63; as a result, the partitioning chamber will not begin to be lifted until the pin member 69 reaches the bottom of the slot 67. Thus, FIG. 3(a) shows the linkage member in its fully raised position, at which time the valves 57 are open; FIG. 3(b) shows the linkage member just after it has begun downward travel—the partitioning chamber and linkage falling freely as indicated by the lift pin 69 being located about midway within the slot 67; FIG. 3(c) shows the half-lowered position, at which time the valves 57 are completely closed; FIG. 3(d) shows the fully lowered position, when the partitioning chamber 41 is resting on the support means 19; and FIG. 3(e) shows the partly-raised position with the pin member 77 raising the circular valve plate 61 to open the valves 57.

Usage and operation of the afore-described filtering machine can be readily understood by first considering the condition where the reciprocatable mechanism has raised the partitioning chamber 41 fully from the granular bed. At that time, the total extent of the granular bed is utilized for filtration; which is to say, influent liquid containing suspended solids is distributed from the flume 27 across the entire surface of the granular bed and the liquid percolates downward so that suspended solids are caught in the interstices in the bed. This filtration operation will continue for a preselected period of time or until some controlling event occurs, such as the measured hydraulic head loss across the filter reaching a predetermined value due to flow resistance arising from captured solids lodged in the interstices of the bed 23, whereupon the bridge 31 will automatically advance to travel on the rails 39a and 39b. (As the bridge travels, the partitioning chamber 41, depending upon the vertical position selected, can be made to skim floating debris on the liquid surface or to level the surface of the granular bed.) Once a preselected position has been reached above the bed, the reciprocatable mechanisms 47a and 47b will be actuated to cause the partitioning chamber 41 to travel downward until it rests against the underdrain support member 19. In the preferred embodiment, the weight of the partitioning chamber 41 is sufficient to enable it to sink into the bed when the reciprocatable mechanisms are actuated. Downward travel of the partition chamber is faciliated by initiating operation of the backwash pump 51 as the partitioning chamber enters into the filter media bed so as to destabilize media below the partitioning chamber, thereby easing penetration of the sidewalls and endwalls 42a and 42b and 43b into the bed. Alternatively, means may be provided to positively force downward motion of the partitioning chamber into the bed.

Once the partitioning chamber 41 has come to rest against the underdrain support 19, the backwash pump 51 continues to draw liquid into the backwash discharge conduit 49. This pumping action causes filtrate to flow from the filtrate-receiving chamber 21 upwardly through the nozzles 20 into the isolated sector of the granular bed. The pumping action is sufficiently vigorous to expand, or fluidize, the granular bed so that collected particulates and other solids are sheared from the granules and entrained in the flow of backwashing liquid and, therewith, carried to discharge into the trough 53. It should be emphasized that while the selected sector of the bed is being backwashed, filtration is taking place in the remainder of the bed. After a preselected period of time, the backwash pump 51 is shut off and the partitioning chamber is raised. The release valves 57 will open just prior to the partitioning chamber 41 begins to rise, thereby allowing liquid to flow into the upper region of the partitioning chamber, starting normal filtration and thereby preventing granular bed material from being drawn upward with the retracting partitioning chamber. Upward travel of the partitioning chamber continues until its sidewalls are above the bed surface, at which time filtration proceeds normally in the previously isolated sector of the bed. The afore-described cycle then resumes, with the bridge progressively traveling across the surface of the filter bed 23 until all sections of the bed are sequentially backwashed.

Referring to FIG. 4, there is shown a second embodiment of the apparatus of this invention, which is adapted to remove filter media, which is no longer suitable for further filtering, from the media bed and replace it with suitable (e.g., new, cleaned or regenerated) media. The apparatus comprises a partitioning chamber 41a and means, such as eductor 91 shown in FIG. 4 or a pump (not shown), for removing the filter media in the partitioning chamber. The eductor comprises a first or inlet tube 93 having a bottom opening adapted to be positioned adjacent the bottom of the bed 23, an annular housing 97 in communication with a source of fluid under pressure and a second or outlet tube 99 on the housing. In the operation of the eductor, fluid under pressure is delivered to the housing 97 and flows out the outlet tube 99 creating a pressure drop for drawing filter media up the inlet tube 93

The filter media withdrawn from the chamber via eductor 91 is then either disposed of or processed in a cleaning or regenerating operation. In this latter regard, filter media of the type such as sand used to entrap and retain suspended solids in a liquid may be conveyed to suitable cleaning apparatus (not shown) located on the carriage, at the tank 11 or at some distance therefrom. Filter media of the type which not only entraps and retains suspended solids but also adsorbs or chemically reacts with suspended or dissolved solids in a liquid, may be removed for transport to suitable regeneration apparatus, in which the media is heated to evaporate and burn off the solids in the filter media.

New filter media, cleaned filter media or regenerated filter media, as the case may be, is delivered to the chamber 41a to replace the withdrawn media via the tubes 101. If the filter media is to be cleaned by apparatus at the tank 11, the tubes 101 are in communication with the cleaning apparatus and the same media withdrawn from the chamber is returned to the chamber. If the filter media withdrawn from the chamber is to be disposed of or is to be cleaned or regenerated at a location apart from the tank, the tubes 101 are in communication with a source of supply of the new, cleaned or regenerated media, and the media withdrawn from the chamber is replaced with different media. Rakes or other suitable apparatus (not shown) may be provided in the chamber 41a for distributing the media delivered via tubes 101 throughout the chamber to a uniform height.

Various alternative structural arrangements can be provided within the scope of the above-described invention. For example, the filter tank can be circular and the partitioning chamber mechanism can be mounted to pivot about the center of the tank; in this embodiment, the partitioning mechanism would, preferably have a wedge-like shape and would be supported at the tank periphery by a circular rail. In this embodiment, the carriage mechanism is indexed circumferentially across the surface of the bed in the circular tank, cleaning successive sectors. Moreover, as previously indicated, the partitioning chamber means may be mounted on a truck or other movable support external to the tank 11 to enable the apparatus of this invention to service numerous tanks. Lastly, while the reciprocatable mechanisms have been shown and described as comprising a series of cranks and linkages, it is contemplated that they may also comprise chain and sprocket arrangements or cable and pulley arrangements.

We claim:

1. Apparatus for removing used filter media of a liquid filtering machine and replacing it with clean filter media, while at the same time enabling the machine to filter liquid, the filtering machine being of the type comprising a tank and at least one continuous bed of granular filter media in the tank free of fixed partition members dividing the bed into predetermined sections, and through which liquid having suspended solids therein flows for removing the solids to clean the liquid, but with the result that the filter media retains solids therein and over time is rendered unsuitable for further filtering of the liquid; said apparatus comprising:
   (a) partitioning chamber means and a carriage mechanism for selectively supporting and conveying the chamber means above the granular filter media bed, the chamber means being selectively insertable through a range of positions into the bed to isolate one section of the bed from the remainder of the bed;
   (b) means to selectively allow insertion of said partitioning chamber means into the bed and removal of said chamber means from the bed; and
   (c) means in communication with the interior of said partitioning chamber means for removing substantially the entire volume of the filter media in the chamber means which has retained solids therein from the chamber means and for delivering clean filter media to the chamber means while filtration may proceed unimpeded in the remainder of the bed.

2. Apparatus as set forth in claim 1 wherein the means for removing the filter media comprises an eductor in communication with the chamber means.

3. Apparatus as set forth in claim 1 further comprising means for introducing fluid under pressure into the media in the chamber means to agitate the media, and means for selectively moving the introduction means into and out of the bed.

4. Apparatus for removing spent filter media of a liquid filtering machine and replacing it with new or regenerated filter media, while at the same time enabling the machine to filter liquid, the filtering machine being of the type comprising a tank and at least one continuous bed of granular filter media in the tank free of fixed partition members dividing the bed into predetermined sections, and through which liquid having dissolved solids therein flows for removing the solids to clean the liquid, but with the result that the filter media retains the dissolved solids and over time is rendered unsuitable for further filtering of the liquid; said apparatus comprising:
   (a) partitioning chamber means and a carriage mechanism for selectively supporting and conveying the chamber means above the granular filter media bed, the chamber means being selectively insertable through a range of positions into the bed to isolate one section of the bed from the remainder of the bed;
   (b) means to selectively allow insertion of said chamber means into the bed and removal of said chamber means from the bed; and
   (c) means in communication with the interior of said partitioning chamber means for removing substantially the entire volume of the filter media in the chamber means which has become spent from the chamber means and for delivering new or regenerated filter media to the chamber, while filtration may proceed unimpeded in the remainder of the bed.

5. Apparatus as set forth in claim 4 wherein the means for removing the filter media comprises an eductor in communication with the chamber means.

6. Apparatus as set forth in claim 4 further comprising means for introducing fluid under pressure into the media in the chamber means to agitate the media, and means for selectively moving the introduction means into and out of the bed.

7. Apparatus for backwashing the filter media of a liquid filtering machine while at the same time enabling the machine to filter liquid, the filtering machine being of the type comprising a tank and at least one continuous bed of granular filter media in the tank free of fixed partition members dividing the bed into predetermined sections, and through which liquid having suspended solids therein flows for removing the solids to clean the liquid, but with resultant retention of the suspended solids in the filter media; such backwashing apparatus comprising:

(a) partitioning chamber means having sides and a closed top but being open at the bottom, and a carriage mechanism for selectively supporting and conveying the chamber means above the granular filter media bed, the chamber means being selectively insertable through a range of positions into the bed to isolate one section of the bed from the remainder of the bed;

(b) means to selectively allow insertion of said partitioning chamber means into the bed and removal of said chamber means from the bed;

(c) means in communication with the interior of said partitioning chamber means to draw liquid through said isolated section of the bed, which has retained solids therein, to backwash said section for removing said solids from the media to clean it, while filtration may proceed unimpeded in the remainder of the bed; and (d) valve means comprising a transfer port having a valve seat in the top of the chamber means, a movable valve member cooperating with the valve seat, and means for moving the movable valve member between open and closed positions, whereby for at lease a substantial portion of the movement of the chamber means through the media bed the port is open and with the chamber fully inserted in the media bed the port is closed.

8. Apparatus as set forth in claim 7 wherein the valve means further comprises means controlling the means for moving the movable valve member.

9. Apparatus as set forth in claim 8 wherein the controlling means and moving meanss includes a linkage mechanism connected to the movable valve member.

10. Apparatus for removing used filter media of a liquid filtering machine and replacing it with clean filter media while at the same time enabling the machine to filter liquid, the filtering machine being of the type comprising a tank and at least one continuous bed of granular filter media in the tank free of fixed partition members dividing the bed into predetermined sections, and through which liquid having suspended solids therein flows for removing the solids to clean the liquid, but with the result that the filter media retains solids therein and over time is rendered unsuitable for further filtering of the liquid; said apparatus comprising:

(a) partitioning chamber means having sides and a closed top but being open at the bottom, and a carriage mechanism for selectively supporting and conveying the chamber means above the granular filter media bed, the chamber means being selectively insertable through a range of positions into the bed to isolate one section of the bed from the remainder of the bed;

(b) means to selectively allow insertion of said partitioning chamber means into the bed and removal of said chamber means from the bed;

(c) means in communication with the interior of said partitioning chamber means for withdrawing liquid from the chamber means, for removing filter media in the chamber means and for delivering clean filter media to the chamber means while filtration may proceed unimpeded in the remainder of the bed; and (d) valve means comprising a transfer port having a valve seat in the top of the chamber means, a movable valve member cooperating with the valve seat, and means for moving the movable valve member between open and closed positions, whereby for at least a substantial portion of the movement of the chamber means through the media bed the port is open and with the chamber fully inserted in the media bed the port is closed.

11. Apparatus as set forth in claim 10 wherein the valve means further comprises means controlling the means for moving the movable valve member.

12. Apparatus as set forth in claim 11 wherein the controlling means and the moving means includes a linkage mechanism connected to the movable valve member.

13. Apparatus for removing spent filter media of a liquid filtering machine and replacing it with new or regenerated filter media, while at the same time enabling the machine to filter liquid, the filtering machine being of the type comprising a tank and at least one continuous bed of granular filter media in the tank free of fixed partition members dividing the bed into predetermined sections, and through which liquid having dissolved solids therein flows for removing the solids to clean the liquid, but with the result that the filter media retains the dissolved solids and over time is rendered unsuitable for further filtering of the liquid; said apparatus comprising:

(a) partitioning chamber means having sides and a closed top but being open at the bottom, and a carriage mechanism for selectively supporting and conveying the chamber means above the granular filter media bed, the chamber means being selectively insertable through a range of positions into the bed to isolate one section of the bed from the remainder of the bed;

(b) means to selectively allow insertion of said partitioning chamber means into the bed and removal of said chamber means from the bed;

(c) means in communication with the interior of said partitioning chamber for withdrawing liquid from the chamber, for removing filter media in the chamber means and for delivering new or regenerated filter media to the chamber, while filtration may proceed unimpeded in the remainder of the bed; and (d) valve means comprising a transfer port having a valve seat in the top of the chamber means, a movable valve member cooperating with the valve seat, and means for moving the movable valve member between open and closed positions, whereby for at least a substantial portion of the movement of the chamber means through the media bed the port is open and with the chamber fully inserted in the media bed the port is closed.

14. Apparatus as set forth in claim 13 wherein the valve means further comprises means controlling the means for moving the movable valve member.

15. Apparatus as set forth in claim 14 wherein the controlling means and the moving means includes a linkage mechanism connected to the movable valve member.

* * * * *